Nov. 23, 1926.
J. R. DESJARDINS
1,608,374
PIPE STEM BIT MACHINE
Filed Nov. 22, 1923          7 Sheets-Sheet 3
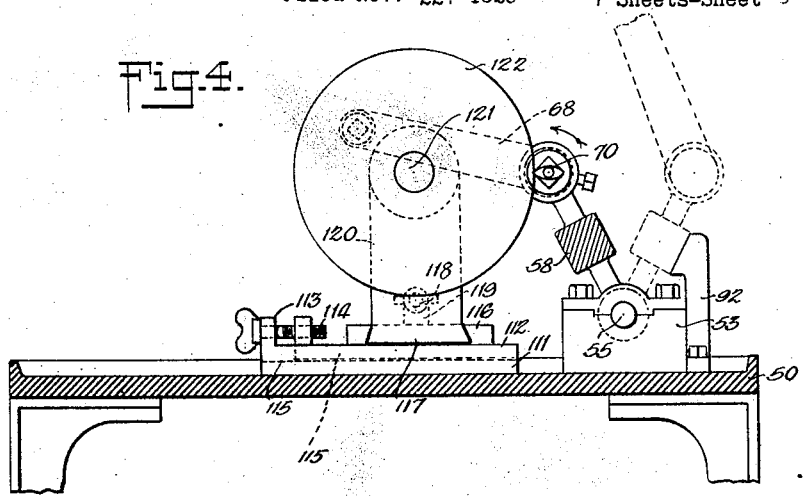
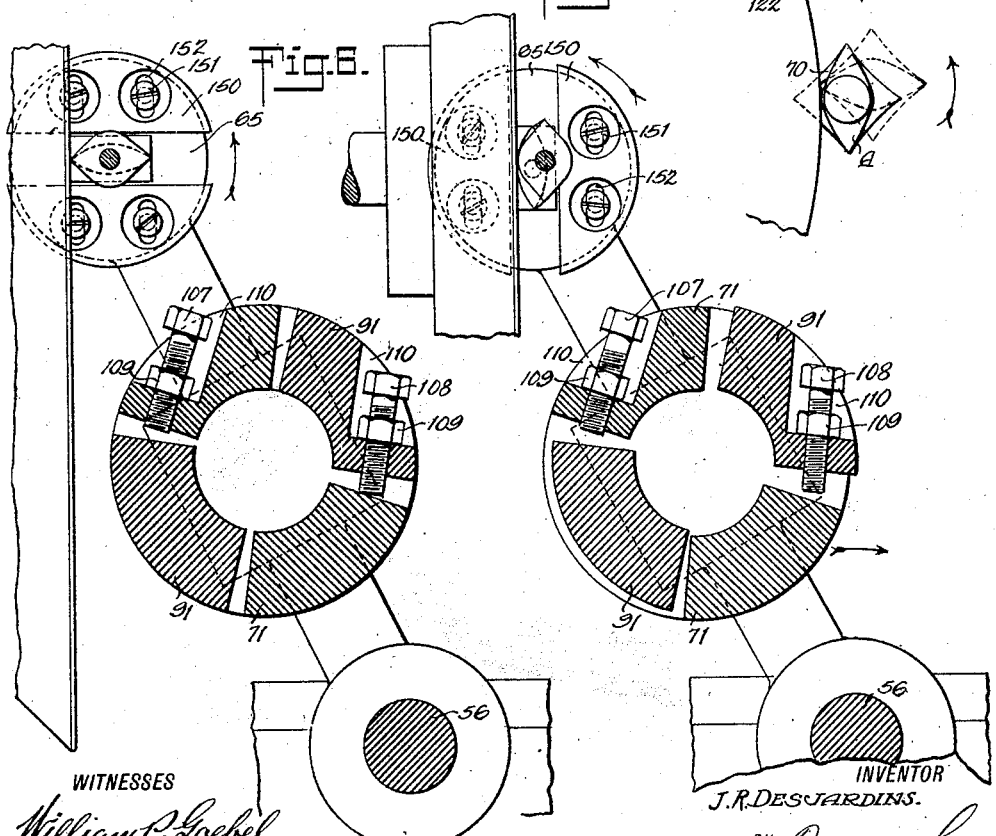
WITNESSES
INVENTOR
J. R. DESJARDINS.
BY
ATTORNEYS Nov. 23, 1926.　　　　　　　　　　　　　　　　　1,608,374
J. R. DESJARDINS
PIPE STEM BIT MACHINE
Filed Nov. 22, 1923　　7 Sheets-Sheet 4
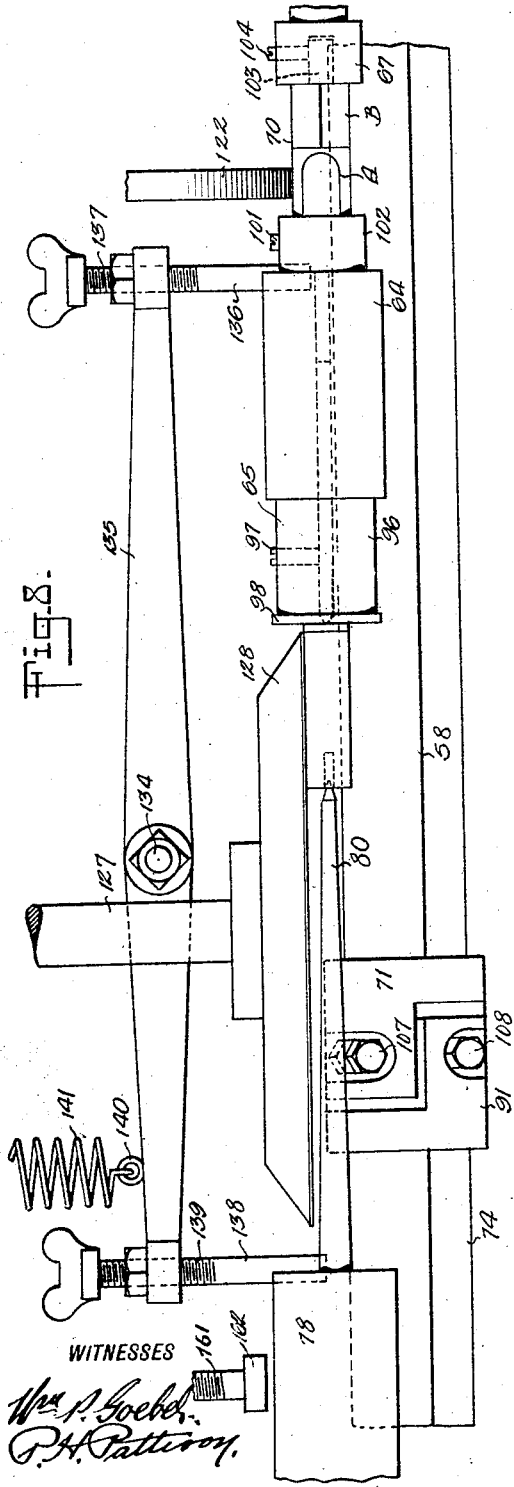
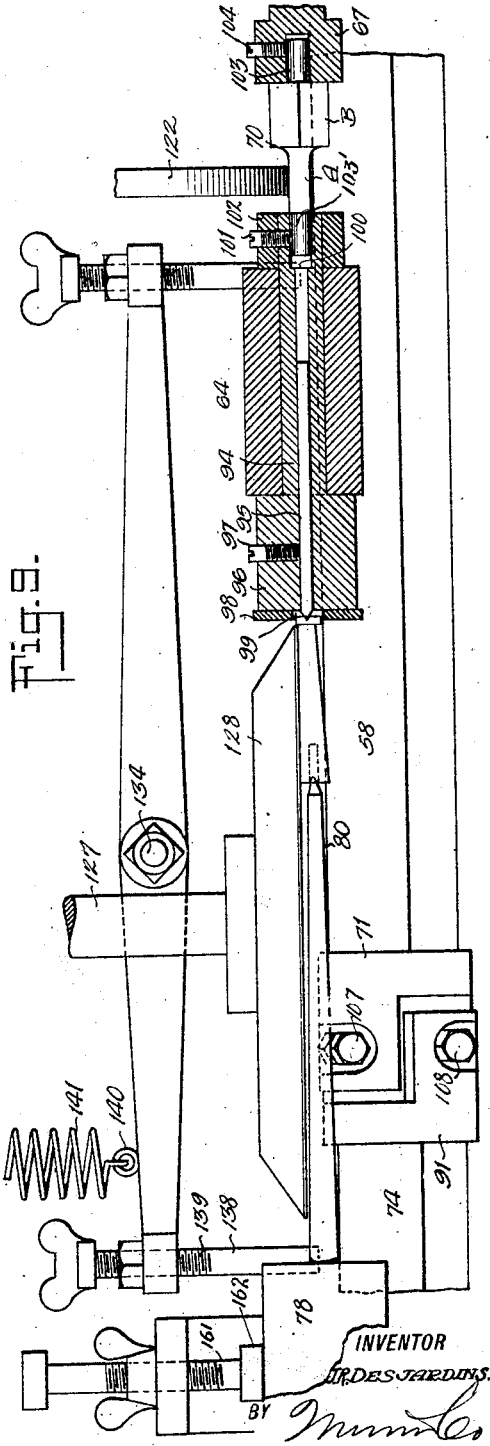
WITNESSES
INVENTOR
J. R. DESJARDINS.
BY
ATTORNEYS Nov. 23, 1926.  1,608,374
J. R. DESJARDINS
PIPE STEM BIT MACHINE
Filed Nov. 22, 1923   7 Sheets-Sheet 5
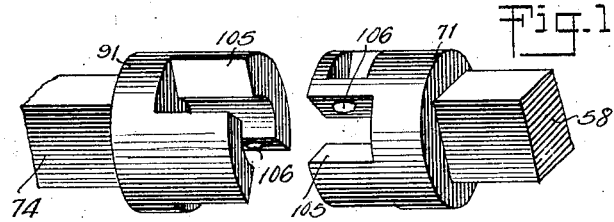
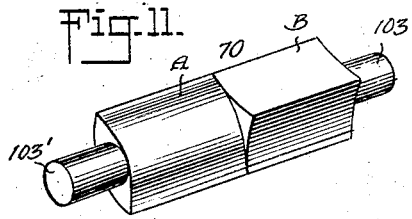
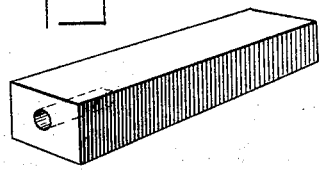
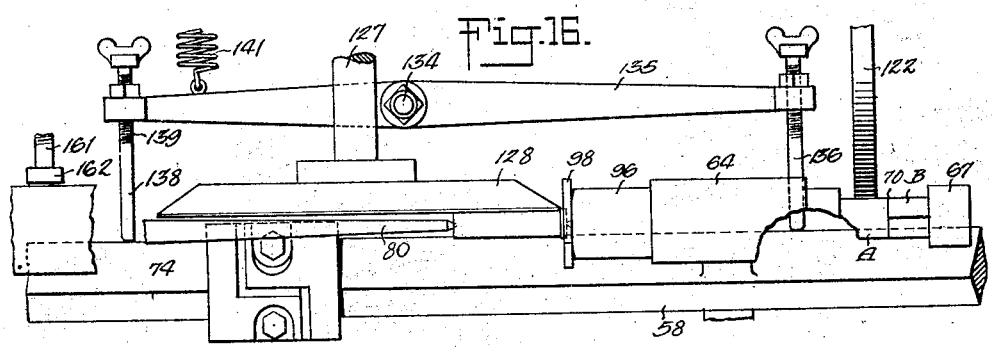
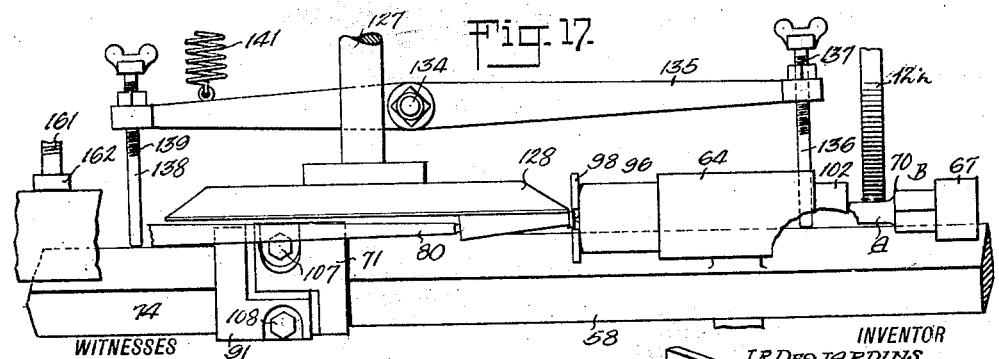
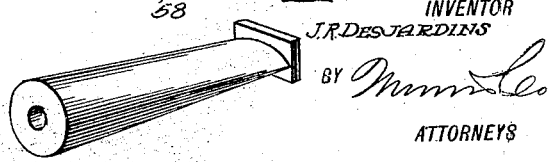
WITNESSES
William R. Goebel
P. H. Pattison
INVENTOR
J. R. DESJARDINS
BY
ATTORNEYS Nov. 23, 1926. 1,608,374
J. R. DESJARDINS
PIPE STEM BIT MACHINE
Filed Nov. 22, 1923     7 Sheets-Sheet 6
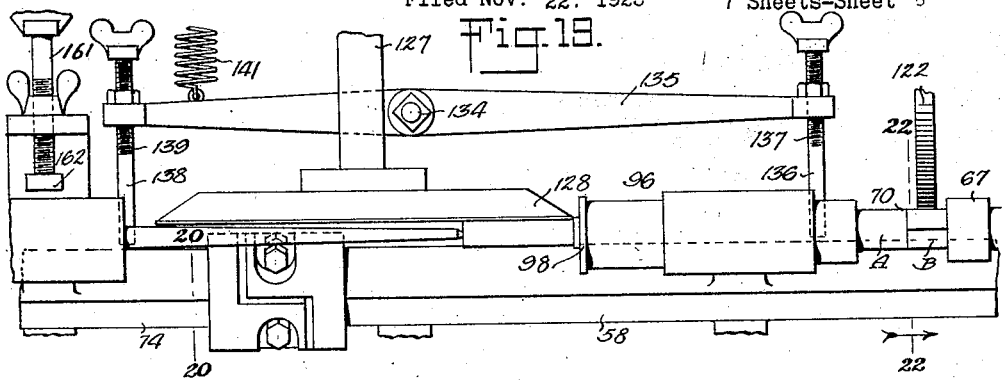
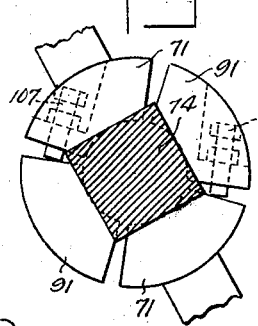 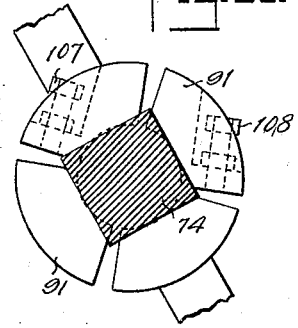 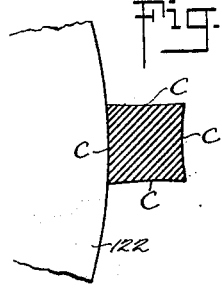
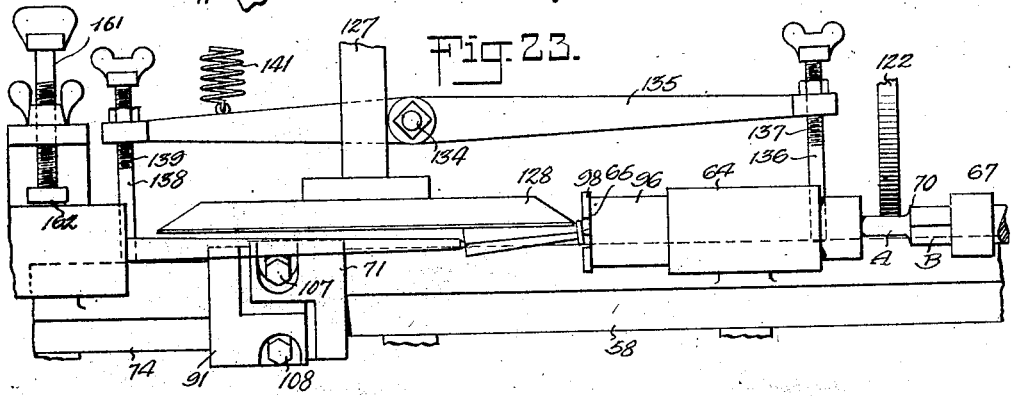
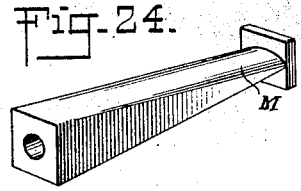 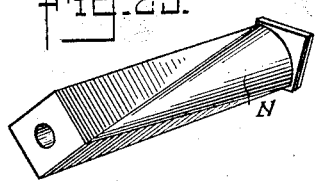
WITNESSES
INVENTOR
J. R. DESJARDINS.
BY
ATTORNEYS

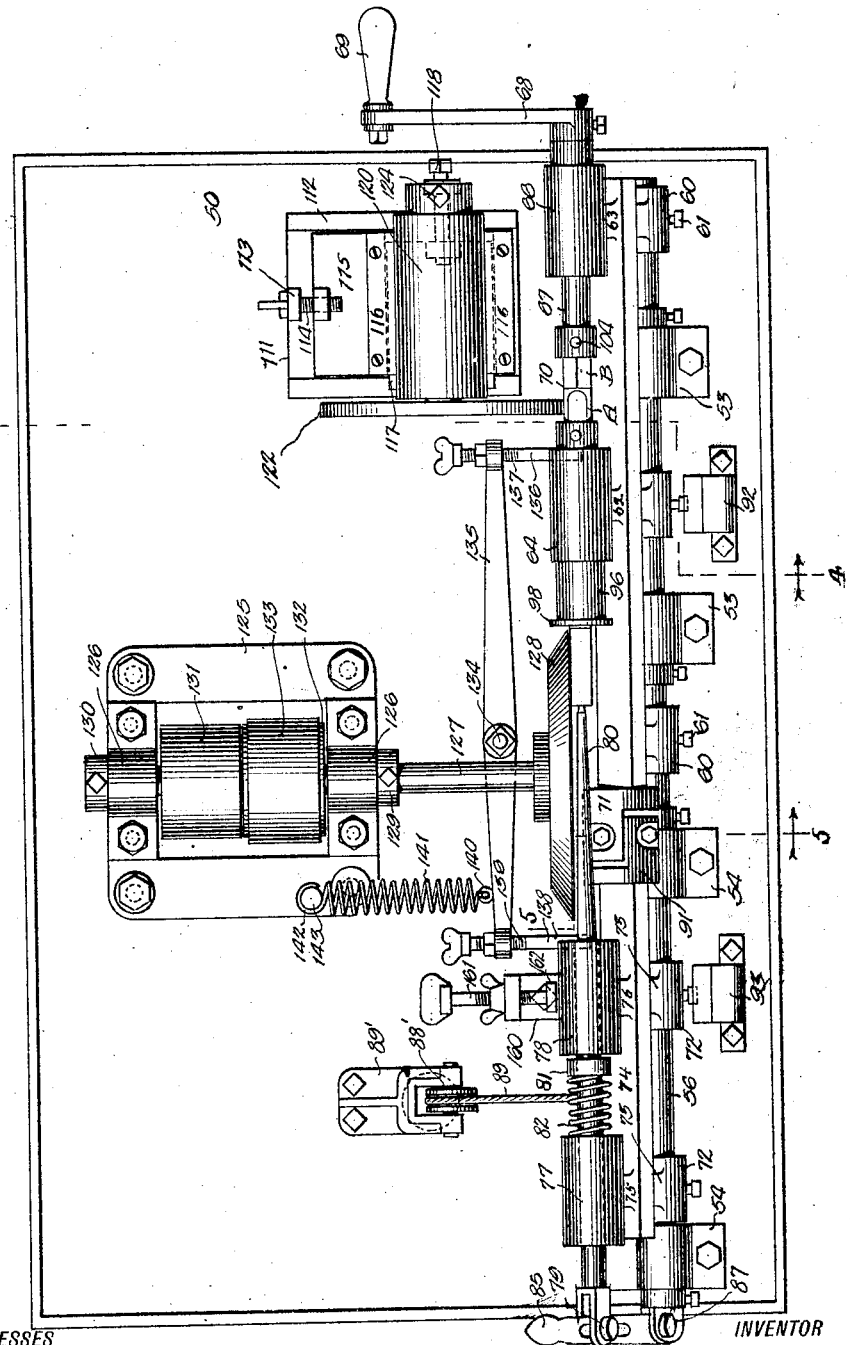

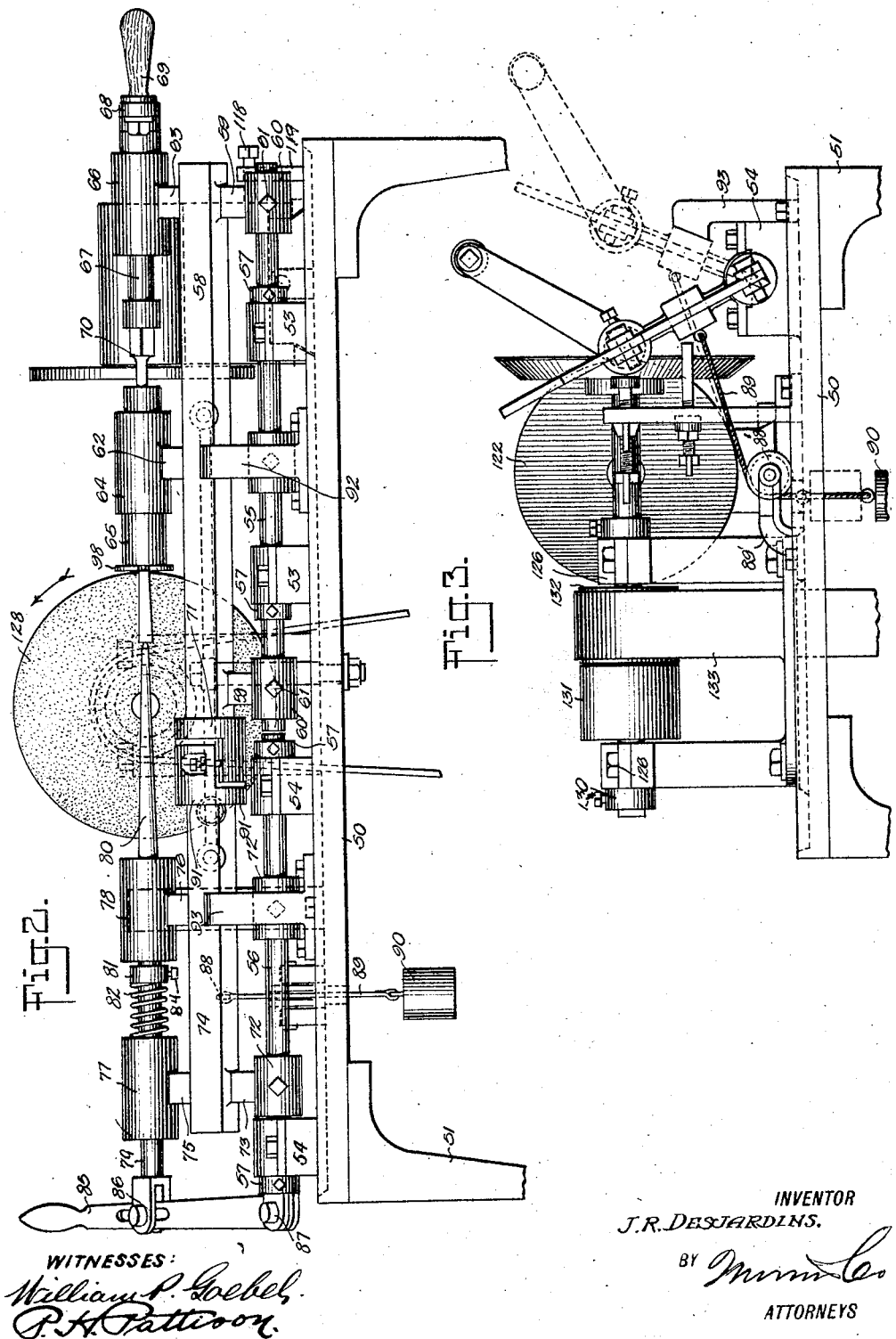

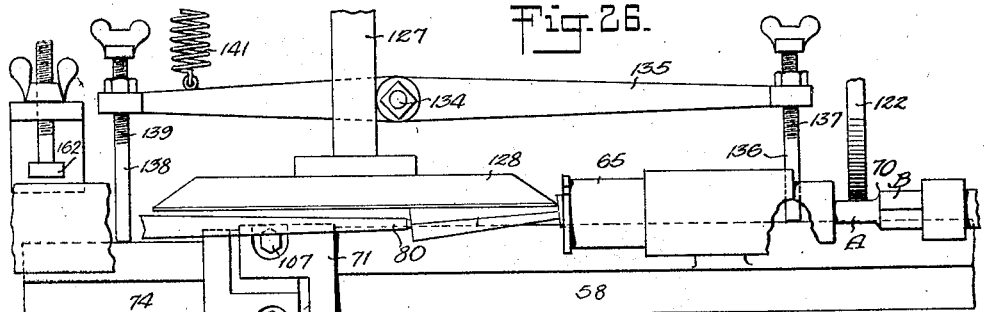
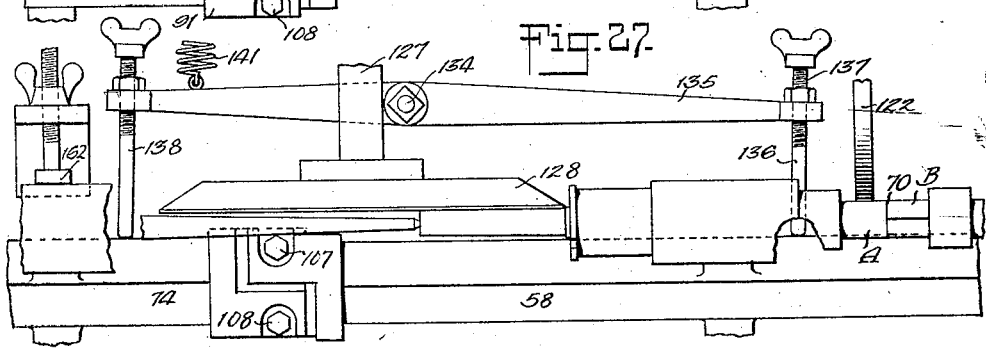
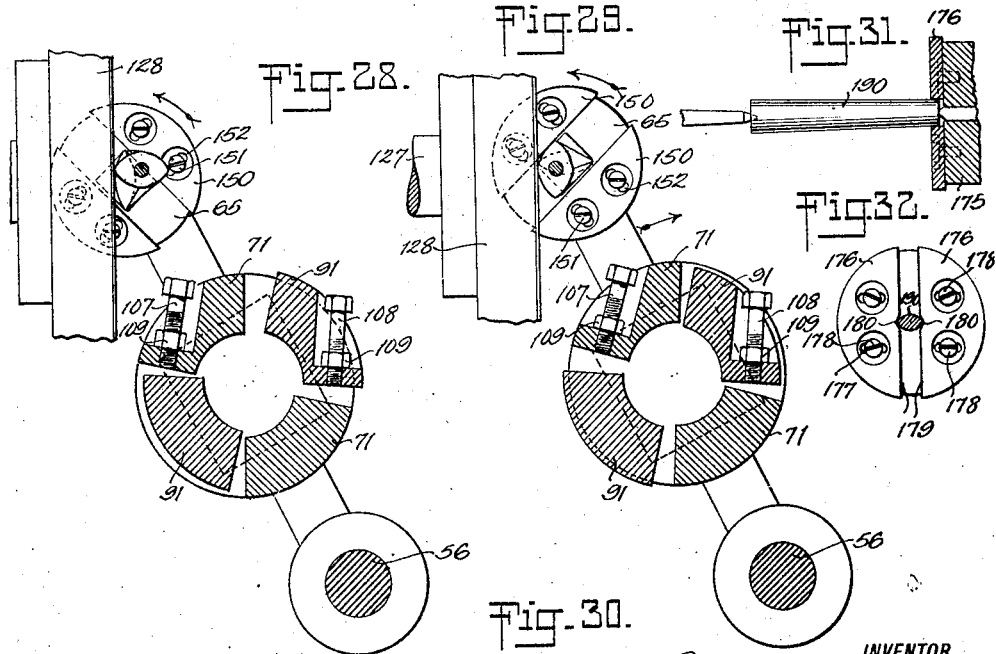

Patented Nov. 23, 1926.

1,608,374

UNITED STATES PATENT OFFICE.

JOSEPH R. DESJARDINS, OF FALL RIVER, MASSACHUSETTS.

PIPE-STEM-BIT MACHINE.

Application filed November 22, 1923. Serial No. 676,391.

The present invention relates to new and useful improvements in cutting and shaping machinery, and it pertains more particularly to a machine especially adapted for shaping pipe stem bits.

The prime object of the invention is to provide a machine in which pipe stem bits of various cross sectional form may be made.

It is a further object of the invention to construct the machine in such a manner that the opposite ends of a piece of stock from which the pipe stem bit is formed, may be differently shaped by the action of the machine.

It is a further object of the invention to provide a machine including a cutting element preferably in the form of a grinder and in which a piece of stock from which the pipe stem bit is formed is moved into and out of engagement with the cutting element in such a manner that a predetermined cross sectional shape may be given to the pipe stem bit.

It is a further object of the invention to provide a machine of this type in such a manner that it will shape a piece of stock from which pipe stem bits are to be formed in true square cross sectional form.

With the above and other objects in view, reference is had to the accompanying drawings, in which—

Figure 1 is a top plan view of a machine constructed in accordance with the present invention;

Fig. 2 is a front elevation of the machine;

Fig. 3 is a view in end elevation looking at the left-hand end of the machine as it is shown in Fig. 2;

Fig. 4 is a transverse sectional view taken on the line 4—4 of Fig. 1;

Fig. 5 is a detail sectional view taken on the line 5—5 of Fig. 1;

Fig. 6 is a similar view showing the parts in a slightly different position from that in which they are shown in Fig. 5;

Fig. 7 is a detail view showing the guide stop and the manner in which it engages against the guide;

Fig. 8 is a top plan view of a portion of the machine showing the position of the parts during one of the operations of the machine;

Fig. 9 is a similar view showing the position of the parts during a further step in the operation of forming a given type of pipe stem bit;

Fig. 10 is a detail perspective view of a coupling mechanism;

Fig. 11 is a detail perspective view of the guide employed in combination with the machine;

Fig. 12 is a perspective view of a piece of stock from which a pipe stem bit substantially oval in cross sectional shape is formed;

Fig. 13 is a view of the pipe stem bit partially completed, said pipe stem bit being of cross sectional form known in the trade as "flat", the transverse dimension of the bit being greater at one end than at the other;

Fig. 14 is an end view of the screw end of the pipe stem bit shown in Fig. 13;

Fig. 15 is a sectional view taken on the line 15—15 of Fig. 13;

Fig. 16 is a top plan view showing the position of the parts of the machine during the operation of forming a pipe stem bit known in the trade as a "round" bit;

Fig. 17 is a similar view of the machine during another step in the above-described operation;

Fig. 18 is a perspective view of the pipe stem bit known in the trade as the "round" bit;

Fig. 19 is a top plan view of a machine showing the position of the parts during the operation of bringing a piece of stock to true square cross sectional form;

Fig. 20 is a detail sectional view taken on the line 20—20 of Fig. 19, and showing the coupler locked during the operation shown in Fig. 19;

Fig. 21 is a cross sectional view showing the coupler in released position to permit of forming the pipe stem bit shown in Fig. 24 in which form the pipe stem bit has oppositely disposed curved sides and is substantially square in cross sectional form at the screw end;

Fig. 22 is a sectional view taken on the line 22—22 of Fig. 19;

Fig. 23 is a detail top plan view of the machine showing the position of the parts during the operation of forming a pipe stem bit of the type shown in Fig. 24;

Fig. 24 is a perspective view of a pipe stem bit square in cross sectional form at the screw end and having oppositely disposed curved faces, the pipe stem being substantially oval in cross sectional form at the lip end;

Fig. 25 is a perspective view of a pipe stem bit of the same general type as the form shown in Fig. 24, the difference in the disposition of the curved faces being approximately ninety degrees;

Figs. 26, 27, 28 and 29 disclose steps in the operation of forming a pipe stem bit oval in cross section at each end, said oval cross sections, however, being disposed in planes at right angles to each other;

Fig. 30 is a perspective view of a pipe stem bit oval in cross section at each end, the oval cross sectional area at one end being positioned in a plane at right angles to the oval cross sectional area at the opposite end;

Fig. 31 is a detail sectional view of a chuck for holding a piece of molded pipe stem stock which is oval in cross sectional form at the end by which it is held in the chuck;

Fig. 32 is a face view of the chuck, the pipe stem bit being shown in cross section.

Referring more particularly to the drawings, the reference numeral 50 designates the bed of the machine, and this bed is preferably supported by means of legs or the like, 51. Carried by the bed of the machine on its upper face and near its front edge, there are two bearings 53 and two bearings 54, the latter bearings being positioned on the left-hand side of the center of the machine, the first-mentioned two bearings being mounted on the right-hand of the center of the machine. Mounted in the bearings 53 there is a shaft 55, and mounted in the bearings 54 there is a shaft 56. Each of these shafts is provided with a plurality of set collars 57, by means of which they may be adjusted in their respective bearings. The reference numeral 58 designates a longitudinally-extending member supported by the shaft 55 by means of rigid arms 59, and such rigid arms 59 carry sleeves 60 having set screws 61, by means of which the member 58 is attached to the shaft 55. Projecting from the member 58, there are two arms 62 and 63. The arm 62 is provided with a cylindrical housing 64, and mounted in the cylindrical housing 64, there is a chuck 65 to be hereinafter more specifically described. The arm 63 carries a cylindrical housing 66, and mounted in such cylindrical housing 66 there is a shaft 67 adapted to be rotated by means of a crank 68 having a crank handle 69. This shaft carries on its inner end a guide member 70, which will be hereinafter more specifically described.

The longitudinally-extending member 58 and the arms 62 and 63 constitute a frame member, which through the medium of the shaft 55, is adapted to be swung toward the operator when the latter is standing in front of the machine. The inner end of the member 58 carries one of the members 71 of an adjustable coupler, the specific construction of which will be hereinafter more specifically described.

Carried by the shaft 56 there are two sleeve members 72, and projecting from each of these sleeve members 72 there is an arm 73. Each of these arms is attached to and serves to rigidly support a longitudinally-extending member 74 positioned in substantial alinement with the longitudinally-extending member 58 heretofore mentioned. Projecting from the longitudinally-extending member 74 are two arms 75 and 76. The arm 75 carries a cylindrical member 77, the arm 76 carrying a cylindrical member 78.

Mounted in the cylindrical members 77 and 78, there is a shaft 79, such shaft having its inner end tapered or of spindle form as designated by the reference numeral 80. Carried by the shaft 79, there is a collar 81, and interposed between the collar 81 and the cylindrical member 77 there is a coil spring 82, which tends at all times to force the shaft 79 to the right in Figs. 1 and 2. To limit this movement to the right, however, the collar 81 is adjustably secured to the shaft 79 by a set screw 84. This shaft 79 has reciprocating movement in the cylindrical members 77 and 78, and is moved to the left by means of a hand lever 85, which is pivotally connected thereto, as at 86, the end of the lever being pivotally connected, as at 87, to the shaft 56 heretofore mentioned. The shaft 56, arms 73, 75 and 76, the longitudinally-extending member 74, and the lever 85, constitute a swinging frame, which is adapted to be moved forwardly of the machine or toward the operator when he is standing in front of the machine.

Connected as at 88 to the longitudinally-extending member 74 and extending over a pulley 88' carried in a bracket 89' secured to the bed, there is a flexible member 89, which carries a weight 90 on its lower end which tends to move this frame inwardly of the machine at all times. The inner end of the longitudinally extending member 74 carries a member 91, which, together with the member 71 heretofore mentioned, forms a flexible coupling between the two frames. These two frames will be hereinafter mentioned as the "right-hand frame" and the "left-hand frame." In order to limit the outward movement, or rather the movement of the right-hand frame in the direction of the operator, a stop 92 is secured to the bed, and in order to limit the outward movement of the left-hand frame a stop 93 is rigidly secured to the bed.

The chuck heretofore referred to is more clearly shown in detail in Figs. 8 and 9, and by reference to such figures, it will be noted that mounted within the cylindrical housing 64, there is a sleeve 94, and mounted interiorly of said sleeve there is a spindle 95. Carried by the spindle 95 there is a block or the like, 96, which is secured to the spindle 95 by a set screw 97. Carried by the block 96 there is a plate 98 having an opening 99 through which the tapered end of the spindle 95 projects.

The passage through the sleeve 94 and in which the spindle 95 is mounted, is recessed at its outer or right-hand end, as designated by the reference numeral 100, and is adapted to receive the inner end of the guide 70 heretofore mentioned, which guide 70 is secured in the sleeve 94 by means of a set screw 101 passing through a collar 102 and engaging a reduced extension 103' of the guide 70. The opposite end of the guide 70 has a reduced extension 103 which is secured by means of a set screw 104 to the shaft 67 heretofore mentioned. The guide member 70 is shown in detail in Fig. 11 and it comprises two sections A and B. The section A is substantially elliptical in cross section and the section B is substantially square in cross section, the faces being, however, slightly curved, as designated by the reference character C in Fig. 22.

The coupler heretofore mentioned as comprising the two members 71 and 91, is shown in detail in Fig. 10. Each of these members comprises a body portion substantially circular in cross section, and each body portion is bifurcated as designated by the reference character 105. These bifurcated body members are adapted for interlocking engagement and each furcation of each member is adapted to be received in one of the cut-out portions 105 of the opposite member, it being understood that the furcations are of smaller cross section than the cut-out portions in order that the two members of the coupler may have a slight independent movement. One of the furcations of each body portion is provided with an opening 106, and mounted in the opening 106 of the member 71, there is a set screw 107 see Figs. 6 and 7, and mounted in the opening 106 of the member 91, there is a set screw 108. Each of these set screws 108 carries a jam nut 109, by means of which it may be retained in adjusted position, and each of the members of the coupler is provided with a cut-out portion 110 to give access to the juxtaposed set screw and jamb nut. The set screw carried by each of these members is adapted to contact with one of the furcations of the opposite member and by an adjustment of the set screw it is obvious that the relative movement between the two members of the coupling may be varied, and thus permit of limited independent movement of the right-hand and left hand frames.

Mounted upon the bed 50 of the machine there is a base plate 111, and said base plate is formed with guides 112, more clearly shown in Figs. 1 and 4. This base plate 111 is also provided with an upstanding member 113 having a plain bore therein for the reception of a threaded bolt 114. This threaded bolt 114 is threaded into a lug carried by a member 115 which is slidably mounted in the guides 112 heretofore mentioned and the engagement of the bolt 114 with the member 113 determines the position in which the member 115 is retained. Mounted on the sliding member 115 are two guides 116 and slidably mounted in said guides and movable in a direction at right angles to the movement of the member 115, there is a member 117, more clearly shown in Fig. 4. The adjustment of this member 117 is maintained by means of a screw 118, shown in dotted lines in Fig. 4 and carried by an upstanding member 119 mounted on the bed 50. This sliding member 117 carries a vertical standard 120 and mounted in the upper end of said standard 120, there is a shaft 121, and carried by the shaft 121 there is a disk-like member 122, which constitutes a guide stop and which is adapted to engaged by the guide 70 at certain stages of operation of the machine. The member 122 is arranged adjacent one end of the bearing of the standard 120, and a collar surrounds the shaft 121 adjacent the opposite end of said bearing and is held in place by a set screw or the like 124. The screw 118 has threading engagement with the standard 120 for effecting the adjustment of the member 117, and therefore the guide stop 122.

Mounted on the bed 50 of the machine there is a base 125 and such base carries two bearings 126. Mounted in these bearings 126 there is a shaft 127 and mounted on the free end of the shaft 127 there is a grinding wheel, preferably in the form of a sandpaper disk and numbered 128. The shaft 127 carries collars 129 and 130, by means of which the shaft is adjusted relative to the bearings 126. Mounted on the shaft 127 are two pulleys 131 and 132, one of which is idle, and a belt passes around these pulleys and is also engaged with a suitable source of power (not shown). This belt forms the means for driving the shaft 127 when it is engaged with the pulley fixed thereon.

Pivotally mounted on the bed of the machine, as at 134, there is a lever 135. Adjustably mounted on one end of the lever 135, there is an arm 136, said arm being screw-threaded, as at 137, to permit of its adjustment in its respective end of the lever 135. Mounted in the opposite end of the lever 135, there is an arm 138, and such arm is screw-threaded, as at 139, to permit of adjustment of the arm relative to its respective end of the lever 135. Connected, as at 140, to the lever 135, there is a coil spring 141, the opposite end of which is connected, as at 142, to a pin 143, which is preferably carried by the base member 125, and this spring tends to rock the lever 135 about its pivotal point for a purpose to be hereinafter described.

Referring to Fig. 1, it will be noted that to the left of the machine and carried by the bed thereof, there is a bracket 160, and having threaded engagement with such bracket 160 there is a screw-threaded shank 161. This screw-threaded shank 161 has a foot 162, which constitutes a stop to limit the movement of the left-hand frame in the direction of the grinding element 128.

The construction of the machine having been described, the manner of operation of the machine to carry out the several operations of which it is capable, will now be set forth.

In describing the manufacture of the various types of pipe stem bits as formed by the machine, the method of operation for forming the pipe stem bit known in the trade as the "flat bit" will be described first.

Referring to Figs. 4 to 15, inclusive, and particularly Figs. 8 and 9, the stock which is shown in Fig. 12, is placed in the machine between the chuck 65 and the spindle 80. The chuck 65 comprises two plates 150 which are adjustably held in place by means of set screws or the like, 151, which in turn operate in arcuate slots 152, the end of the stock being secured between the adjacent edges of these plates 150.

The operator now exerts pressure by means of his left hand upon the right-hand frame, and grasping the crank handle 69 with his right hand, operates the shaft 67. As the operator moves the frame under the pressure of his left hand the portion A of the guide 70 is moved into engagement with the guide stop 122. As the shaft 67 is rotated, the guide 70 is rotated with its portion A in engagement with the guide stop 122 and the right-hand frame is moved under the influence of the portion A of the guide toward the operator, this movement being caused by a constant engagement of the portion A of the guide with the guide stop 122.

As the right-hand frame moves toward the operator the lower element of the member 71 of the coupler, which member is carried by the right-hand frame, engages the set screw 108 of the upper element of the member 91 of the left-hand frame and causes a similar movement of the left-hand frame, that is, a movement of the left-hand frame in the direction of the operator. It is understood that the frames are moved in the direction of the operator when the thicker portion of the section A of the guide 70 is engaged with the guide stop 122, and when the thinner portion thereof is engaged with the guide stop 122 the frames are moved in a direction away from the operator. When moving in the direction of the grinding element, the left-hand frame engages the stop 162 in order to preserve the rounded surfaces and the desired thickness at the screw end of the bit.

It is also to be understood that as the frames move in a direction toward the operator they move in a direction away from the grinding element 128 and that when they move in a direction away from the operator they move in the direction of the grinding element 128. The left-hand frame, however, is moved in a direction away from the operator and toward the grinding element 128 under the influence of the weight 90 and its flexible connection 89 with the left-hand frame, and is moved against the influence of the weight 90 and its flexible connection 89 when moved toward the operator and in a direction away from the grinding element.

From the foregoing it is apparent that the continued operation as just described moves the stock relative to the grinding element 128 in such a manner that a pipe stem bit, such as shown in Fig. 13, results, which pipe stem bit is oval or substantially oval in cross sectional form and known in the trade as the "flat bit".

While in the foregoing description it is stated that the frames move in a direction away from the grinding element, it is to be understood that the stock at all times engages the grinding element and the relative movement between the frames permits of obtaining a taper in the finished article.

In Fig. 18 is shown a pipe stem bit known in the trade as the "round bit" due to the true circular formation of the screw end of the bit. The method of forming this bit is illustrated in Figs. 16 and 17.

Referring to Figs. 16 and 17, the stock is placed between the chuck 65 and the spindle 80, as in the form above described, and the shaft 67 of the chuck is rotated by the crank 69 as heretofore set forth.

The portion A of the guide 70 is engaged with the guide stop 122, and upon rotation of the shaft 67 the right-hand frame is moved toward and away from the grinding element 128 dependent upon that portion of the section A of the guide which engages the guide stop 122.

The stop 162 heretofore mentioned is set and the grinding operation is started. As the stock is ground circular at one end, when the proper circular dimension is reached the left-hand frame engages the stop 162 and further grinding of the circular or screw-end of the bit is prevented.

In order that the bit may be substantially oval in cross section at the lip end, the right-hand and left-hand frames are moved independently of each other and this is accomplished in the following manner: As the right-hand frame moves in the direction of the grinding element 128, it will engage the arm 136 and will rock the lever 135 about its pivotal point 134 and against the action of the spring 141. This moves the arm 138 into engagement with the left-hand frame and causes the left-hand frame to rock outwardly or in a direction toward the operator. This action takes place as the thinner dimension of the section A of the guide 70 engages the guide stop 122. When the thicker dimension of the section A of the guide engages the guide stop 122, the right-hand frame will be rocked outwardly or in a direction toward the operator and through the medium of the spring 141 the lever 135 will be rocked about its pivotal point 134 in the opposite direction, thus causing the arm 136 to follow the right-hand frame. This action permits of the left-hand frame moving in a direction toward the grinding element under the influence of the weight 90 and the flexible connection 89 heretofore mentioned until such frame engages the stop 162. At the time the thinner dimension of the portion A of the guide 70 engages the guide stop 122, the left-hand frame is given a very slight movement toward the operator by means of the lever 135 and the arm 138 in order to preserve the true circular form at the screw end of the bit.

From the foregoing it is apparent that the adjustment of the stop 162 determines the diameter of the circular or screw end of the so-called "round bit", such as shown in Fig. 18.

In order that the bit shown in Fig. 18 may be tapered or substantially oval in cross sectional form at its lip end, the spindle 80 is maintained in a position where it is out of axial alinement with the chuck 64, when the thinner diameter of the section A of the guide 70 is in engagement with the guide stop 122, which position of the chuck and spindle is shown in Fig. 17, as is also the angular position of the stock from which the bit is being formed.

During this operation the coupler comprising the members 71 and 91, performs no function, the set screws 107 and 108 thereof being backed out to a point where there is no engagement between the parts, and, therefore, the frames are capable of independent movement.

In Fig. 24 is shown a pipe stem bit of the so-called "square" type in which a curved surface is formed on one of the flat sides of the body of the bit, as at M in said figure, and in Fig. 25 is shown a so-called "square" pipe bit in which curved surfaces are formed at diametrically opposite locations by removing opposed corners of the square bit as illustrated at N in said Fig. 25. The pipe stem bit shown in Fig. 24 is formed on the machine by a series of operations illustrated in Figs. 19 to 22, inclusive, and the pipe stem bit shown in Fig. 25 is formed by the operation illustrated in Fig. 23.

In forming the so-called "square" pipe stem bit the guide stop 122 is adjusted to a position to the right in Fig. 1 and where it will be engaged by the section B of the guide 70, the guide stop 122 being moved in the guides 116 by means of the adjustable screw 123. With the parts in this position a piece of stock is inserted between the chuck 65 and the spindle 80 and if the crank 69 is operated and the right-hand frame forced inwardly by the operator to maintain the guide stop 122 in engagement with the section B of the guide, the stock will be cut to true square form.

It is to be understood that while the operation of squaring the stock is carried out the two frames are locked together by turning down the set screws 107 and 108 until they engage their respective opposed parts to bring about the locking together of the two frames. After the stock has been ground to true square form and it is desired to make a pipe stem bit of the type shown in Fig. 24, the guide stop 122 is adjusted so that it will engage the section A of the guide 70 and the set screws 107 and 108 are backed out to permit of independent movement of the frames.

If, now, the crank 69 is operated the square stock will be formed with curved surfaces on opposed flat faces and the pipe stem bit, as shown at M in Fig. 24, will be produced. This operation is illustrated in Fig. 23, and as the right-hand frame moves toward the grinding element 128, through the medium of the lever 135 heretofore mentioned the left-hand frame is pushed in a direction toward the operator, and as the right-hand frame moves in a direction toward the operator the left-hand frame moves in a direction away from the operator until it engages the stop 162, the left-hand frame being moved by the weight 90 and its flexible connection 89.

When it is desired to form the pipe stem bit shown in Fig. 25, in which the curved surfaces are diametrically opposed, as shown at N, and formed on diametrically opposed corners of the square stock, the set screw 104 is loosened and the guide 70 is given a quarter turn. This positions the thinner dimension of the section A of the guide 70 ninety degrees from the flat side of the stock and causes the stock to be moved in the direction of the grinding element 128 at such a time that two of its opposite corners will engage the grinder and the curved surface will be formed at diametrically opposed points by grinding away the corners of the square stock. In this form of the invention the set screws 107 and 108 of the coupler are backed out in order that the frames may have independent movement as heretofore described.

In Fig. 30 is shown a pipe stem bit in which the screw end is of oval cross sectional form, as designated by the reference character O, and the lip end is also of cross sectional form, as designated by the reference character P. The oval cross sectional forms O and P of the ends, however, are so positioned with respect to the bit that they are at right angles to each other. That is to say, the greater dimension of the oval cross sectional form on one end is at right angles to the greater dimension of the oval cross sectional form on the opposite end. This form of bit is formed by a sequence of operations illustrated in Figs. 26 to 29.

In forming this type of pipe stem bit the two members 71 and 91 of the coupler are disconnected by backing out the set screws 107 and 108 to permit of independent movement of the frames. The stock is placed between the chuck 65 and the spindle 80, and the right-hand frame is moved in a direction away from the operator until the oval cross sectional portion A of the guide 70 engages the guide stop 122. The guide 70 is now rotated as heretofore described, and the movement of the right-hand frame is controlled by the rotary movement of said guide in the heretofore described manner. As the right-hand frame moves inwardly it engages the member 136 to rock the lever 135 about its pivotal point 134, and the member 138 by this movement engages the left-hand frame and moves the same outwardly. Thus it will be seen that the two frames move in opposition to each other. That is, when one moves in a direction toward the operator, the opposite one moves in a direction away from the operator.

By this construction it is apparent that when the greater dimension of the portion A of the guide 70 is in engagement with the guide stop 122, the right-hand frame is moved in a direction toward the operator to its greatest extent.

With the parts in this position the stock engages the grinding element 128 in such a manner that the smaller dimension of the oval of the screw end is in engagement with the grinding element while the greater dimension on the lip end being at right angles to the greater dimension on the screw end, is clearing the grinding element in order to preserve the true oval form. As the operation continues and the smaller dimension of the portion A of the guide 70 engages the guide stop 122, the right-hand frame is moved in a direction toward the grinding element 128 and the left-hand frame moving in the opposite direction causes the greater dimension of the oval on the screw end of the bit to clear the grinding element 128 while the lesser dimension on the lip end of the bit is being formed.

While the two frames are capable of independent movement, the greater dimension on the screw end of the bit is determined by the relative movement permitted by the coupler, since as the right-hand frame is moved inwardly and the left-hand frame is moved outwardly, the several elements of the coupler will engage each other and thus, obviously, will limit the relative movement of the frames and consequently determine the greater dimension, the maximum of which will be equivalent to the relative movement between the members of the coupler. In order to preserve the true oval form at the screw end of the bit, the left-hand frame is given a slight movement by the lever 135 and the arm 138 in the direction of the operator at the time the thinner dimension of the section A of the guide 70 engages the guide stop 122.

In Figs. 31 and 32 is shown a chuck especially adapted for use in holding what is known in the trade as "molded bits." This form of chuck comprises a block 175 on which are mounted two plates 176, and each of such blocks has arcuate slots 177 for the reception of screws 178 by means of which the plates are secured and adjusted in place. The meeting edges 179 of these plates 176 are notched as at 180, and the bit 190 is retained in these notches against rotary movement. It is to be understood that in this form the bits are round or normally so as distinguished from the square stock employed in the previously described forms of pipe stem bits.

What is claimed is:

1. A shaping lathe including in combination a material removing tool; a pair of frames each having means for rotatably mounting one of the opposite ends respectively of the same piece of work and mounted for independent movement toward and from said tool; a two-part coupler connecting said frames and having a play permitting lost motion between its parts, thus tending to cause said movement of one frame to move the other in unison and in the same direction but permitting a limited relative or independent motion, and means limiting movement of one of the frames toward the shaping tool while permitting further movement of the other frame.

2. A shaping lathe such as defined in claim 1, in which means are provided for adjustment of the amount of play or lost motion between the coupler parts.

3. A shaping lathe such as defined in claim 1, in which means are provided for diminishing the amount of lost motion to zero.

4. A shaping lathe such as defined in claim 1, in which there are means for yieldably urging one of the frames toward the tool.

5. A shaping lathe including in combination a material removing tool; a pair of frames each having means for rotatably mounting one of the opposite ends respectively of the same piece of work and mounted for independent movement toward and from said tool and an independent lever, the respective arms of which are engaged by the frames in their movement toward the tool so that further movement of one frame will move the other frame in the opposite direction.

6. A shaping lathe such as defined in claim 1, which is further provided with an independent lever, the respective arms of which are engaged by the frames in their movement toward the tool, so that further movement of one frame will move the other frame in the opposite direction.

JOSEPH R. DESJARDINS.